United States Patent [19]

Amerson et al.

[11] Patent Number: 5,564,031

[45] Date of Patent: Oct. 8, 1996

[54] DYNAMIC ALLOCATION OF REGISTERS TO PROCEDURES IN A DIGITAL COMPUTER

[75] Inventors: Frederic C. Amerson, Santa Clara; Robert M. English, Menlo Park; Rajiv Gupta, Los Altos, all of Calif.; Tan Watanabe, Yokohama, Japan

[73] Assignees: Hewlett-Packard Company, Palo Alto, Calif.; Hitachi, Ltd., Tokyo, Japan

[21] Appl. No.: 629,041

[22] Filed: Apr. 12, 1996

Related U.S. Application Data

[63] Continuation of Ser. No. 223,804, Apr. 6, 1994, abandoned.

[51] Int. Cl.$^6$ .................................................. G06F 12/06
[52] U.S. Cl. ........................... 395/419; 395/800; 395/437
[58] Field of Search .................................. 395/437, 800, 395/419

[56] References Cited

U.S. PATENT DOCUMENTS

| | | | |
|---|---|---|---|
| 3,737,871 | 6/1973 | Katzman | 395/410 |
| 4,445,173 | 4/1984 | Pilat et al. | 395/375 |
| 4,524,416 | 6/1985 | Stanley et al. | 395/425 |
| 4,777,588 | 10/1988 | Case et al. | 395/800 |
| 4,969,091 | 11/1990 | Muller | 395/775 |
| 5,036,454 | 7/1991 | Rau et al. | 395/375 |
| 5,083,263 | 1/1992 | Joy et al. | 395/800 |
| 5,083,267 | 1/1992 | Rau et al. | 395/375 |
| 5,129,067 | 7/1992 | Johnson | 395/375 |
| 5,159,680 | 10/1992 | Joy et al. | 395/775 |
| 5,226,128 | 7/1993 | Rau et al. | 395/375 |
| 5,226,142 | 7/1993 | Vegesna et al. | 365/230.02 |
| 5,233,691 | 8/1993 | Ando et al. | 395/250 |
| 5,276,820 | 1/1994 | Ikenaga et al. | 395/375 |
| 5,440,714 | 8/1995 | Wang | 395/492 |

OTHER PUBLICATIONS

Hennessy et al., "Computer Architecture A Quantitative Approach" 1990, pp. 432–448, 450–453.
Patterson and Hennessy; Computer Archtecture A Quantitative Approach; pp. 450–454, 484, 486, 487.

Primary Examiner—William M. Treat
Assistant Examiner—Kenneth R. Coulter

[57] ABSTRACT

In a digital computer, a circular queue of registers in a register file are allocated as temporary local storage for procedures rather than using the known caller/callee save convention in order to minimize main memory references. A called procedure dynamically allocates local registers as needed without regard to registers used by the caller of the procedure or by any callee of the procedure, whereby register allocation is not restricted by any predetermined window size. Local registers, including parameter passing registers, are allocated in the called procedure, rather than a priori at compile time, by adjusting register stack pointer values. Only the number of registers actually required by the procedure need by allocated. Optionally, rotating registers may be allocated among the local registers. Stack pointer values are stored in one of the parameter passing registers when a procedure is called. Hardware register file access circuitry maps virtual register numbers used by the procedures into the hardware register file. Upon return from a procedure, registers are deallocated by adjusting the register stack pointers to the values stored when the procedure was called.

9 Claims, 8 Drawing Sheets

DYNAMIC ALLOCATION OF REGISTERS TO PROCEDURES IN A DIGITAL COMPUTER

This is a continuation of application Ser. No. 08/223,804 filed on Apr. 6, 1994, now abandoned.

BACKGROUND von Neumann architecture digital computers have a register set for holding various values during operation. The size of the register set may vary. All von Neumann machines have at least a program counter (PC). Generally, there are also several registers for holding operands and results ("operational registers"). RISC (reduced instruction set computer) machines generally have only register-to-register instructions (as distinguished from instructions that directly access memory) except for LOAD and STORE instructions, which read from memory or write to memory but do not operate on the data. They tend to have larger register sets, numbering for example 32 or more registers. Registers are used for holding intermediate results, address indexing, and passing data (parameters) between calling and called procedures such as subroutines. Some processors have floating-point registers in addition to general registers. CISC architectures usually have evaluation stacks, thus providing for 0-address operations in which the operands are implicit. RISC architectures usually do not have evaluation stacks. The compiler normally keeps a stack in memory on RISC architectures, primarily for parameter passing and register spills rather than for computation.

In most architectures, the overhead of saving and restoring registers on procedure calls is burdensome; it can account for 5% to 40% of main memory references. To reduce this overhead, it is known to provide several banks of registers, with a new bank of registers allocated to each called procedure. This technique has been termed register windows. See J. Hennessy and D. Patterson, Computer Architecture—a Quantitative Approach (1990), Section 8.7. Using register windows, the register banks or "windows" are overlapped to provide a common area for passing parameters. Registers are divided into global registers, which do not change on a procedure call, and local registers which do change. A block of registers is saved to memory when the buffer is full and followed by a call (window overflow); or when it is empty and followed by a return (window underflow).

Register windows are implemented currently in Sun Microsystems SPARC® architecture, and are further explained in U.S. Pat. No. 5,159,680 which shows operating register windows in a ring configuration. U.S. Pat. No. 5,233,691 discloses a register window system for reducing the need for overflow-write by prewriting registers to memory during times without bus contention. A high performance register file that implements overlapping windows is disclosed in U.S. Pat. Nos. 5,226,142. 5,226,128; 5,083,267; and 5,036,454 disclose use of rotating registers for loops.

One of the problems with prior art architectures such as register windows is that the size of a bank of registers (i.e a register window) is fixed; it cannot vary from procedure to procedure. As a result, not all registers in a local register area allocated to a procedure are actually used by that procedure, and conversely, in many cases, procedures are not allocated enough registers as required by the procedures. This causes performance degradation because memory references are not optimal.

Another limitation of register windows is that the number of overlapping registers also is fixed. Again, that number may well exceed the number of parameters actually necessary for the called procedure, again reducing the density of register usage. Moreover, this fixed overlap imposes an arbitrary limit on the number of passed parameters in connection with a single procedure call.

Rotating register space is used by a software pipelined loop in order to begin to prepare data several cycles before an operation using it is invoked and make the data available just at the time the data is required. The number of registers required in the software pipelined loop varies according to the characteristics of the loop. If the size of rotating register space is fixed, as in the prior art, one must allocate ample space e.g. 64 registers, to cover most loops. There are, however, many small loops which require 16 or fewer registers and many large loops which requires more than 64 registers. For the small loops, many registers are allocated and freed unnecessarily, and for the larger loops, processing speed is slowed down because of the shortage of registers.

In view of the foregoing introduction, what is needed is a more efficient method of allocating and deallocating registers that is not confined by the fixed group size of prior art register windows.

SUMMARY OF THE INVENTION

In view of the foregoing background, an object of the present invention is to improve average speed of procedure call and return operations in a computer.

Another object is to minimize the number of register saves and restores in operation of a processor.

Another object is to efficiently allocate temporary local storage needed by called procedures.

A further object of the invention is to allocate sufficient register storage without regard to storage used by the caller of a routine or by any callee of the routine.

A further object is to improve efficiency by avoiding saving and restoring registers that are not being used currently.

Yet another object is to reduce overhead associated with allocating and saving a limited number of registers available in a processor.

A still further object is to dynamically partition a register set to meet called procedure requirements, including allowing the full range of registers to be utilized by any procedure that needs it.

Another object is to allocate to a procedure exactly the number of rotating registers required by it for a software pipelined loop.

Another object is to increase the density of register usage.

Yet another object is to effect register saving and restoring without compiler intervention.

One aspect of the present invention partitions the physical registers into static registers and stack registers. It permits the stack registers to be addressed indirectly through base or relocation registers that point into the stack. Instead of requiring procedures to save registers at procedure calls, and restore saved registers at procedure returns, the present method permits every procedure to allocate from the stack (and deallocate to the stack on the return) a set of registers that is independent of its caller. If such allocation does not result in a stack overflow or underflow, no memory accesses are required.

If hardware implements a sufficiently large stack, then the immediate availability of local registers to a called procedure, the availability of the memory pipes that would otherwise have to save and restore registers, and the improved cache behavior resulting from the reduction in memory traffic is expected to improve system throughput, resource utilization, and execution time of programs.

The exact number of registers requested (and presumably required) by a procedure are allocated to that procedure. More specfically, according to the invention, each procedure and each loop are allocated exactly a required number of registers to fit to their characteristics. Thus, no registers are either allocated unnecessarily nor saved/restored unnecessarily. This feature leads to the efficient use of registers and shortening execution time.

Thus the invention includes a method of dynamically allocating registers to procedures in a digital computer without compiler intervention. The method includes the steps of: defining a logical register stack comprising a plurality of stack registers; initializing a local relocation term (called "lrel") to define an offset for mapping the logical register stack into the physical register set of the computer; allocating to a first procedure an arbitrary number of stack registers specified by the first procedure as local registers by initializing a first stack pointer value (TOL) so as to delimit the local registers in the logical register stack; and in connection with a register access operation during execution of the first procedure, mapping each local register into the physical register set responsive to the local relocation term.

In preparation for calling a second procedure, the method calls for storing the first stack pointer value (TOL) as a second stack pointer value called "old TOL" (OTOL); allocating to the first procedure a number of additional stack registers specified by the first procedure as parameter passing registers by incrementing the first stack pointer value (TOL) so as to include the parameter passing registers; and storing selected parameters in the allocated parameter passing registers for reference by a called procedure. We also map the parameter passing registers into the physical register set responsive the local relocation term.

Upon calling the second procedure, the method further includes allocating to the second procedure an initial local register space that includes the first procedure parameter passing registers. This step makes the parameters stored in those registers available to the second procedure without a memory reference. A number of additional stack registers as required by the second procedure are allocated to the second procedure as local registers by incrementing the first stack pointer value. This allocation is done without first saving the first procedure's local registers' contents to memory. Upon returning from the second procedure, the inventive method includes deallocating the local registers by decrementing the first stack pointer value by the number of local registers. Thus the method includes calling and returning from the second procedure without saving and restoring local register contents.

Another aspect of the present invention is a register file port access circuit for providing a physical address to a register file port. The circuit receives a virtual address; compares it to the static register address space and indicates whether or not the virtual address is within the static register address space. If so, the circuit couples the virtual address to the register file port as a first physical address for accessing a corresponding register. The circuit further includes circuitry for combining the virtual address with a local relocation term to form a second physical address; and means for coupling the second physical address to the register file port as an address if the virtual address is not within the static register address space. The access circuit is arranged for adding the local relocation term to the virtual address modulo a predetermined total number of physical registers.

The foregoing and other objects, features and advantages of the invention will become more readily apparent from the following detailed description of a preferred embodiment which proceeds with reference to the drawings.

BRIEF DESCRIPTION OF THE DRAWINGS

FIG. 2 is a logical address space model for a set of registers.

FIG. 3A–3I are a series of logical address space models for the register set of FIG. 2 illustrating operation of the present invention.

FIGS. 4A–4I are a series of physical address space models corresponding to the logical address space models of FIGS. 3A–3I, respectively.

DETAILED DESCRIPTION OF A PREFERRED EMBODIMENT

Figure 1:
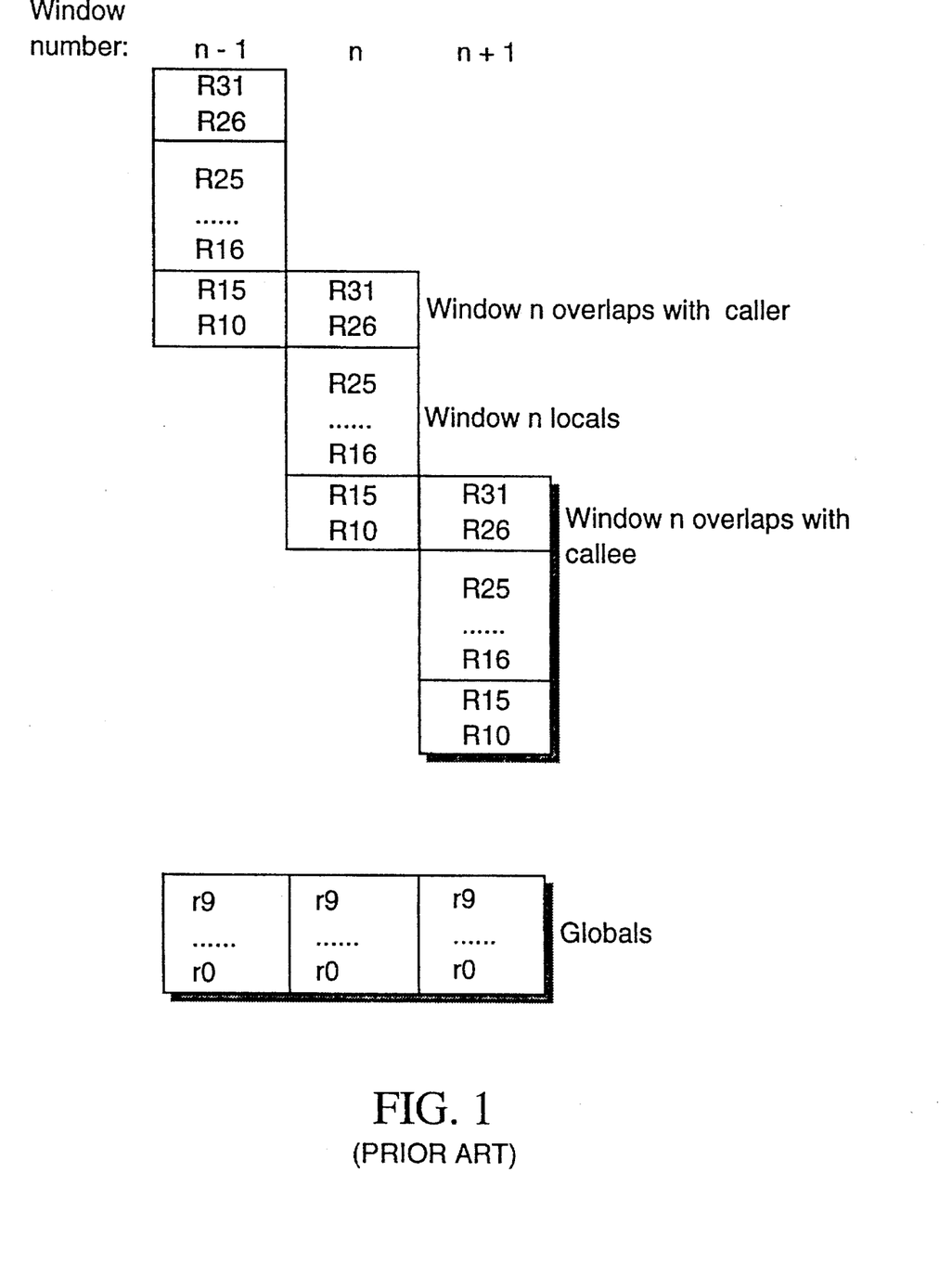
FIG. 1 is a conceptual diagram illustrating register windows.

FIG. 1 is a conceptual diagram that illustrates a prior art method of allocating registers known as register windows. In the following description, reference numbers are used to refer to portions of the address space model as indicated in the drawing. Drawing reference numbers should not be confused with register numbers. We will use lower case r to indicate a physical register number and upper case R to indicated a logical or virtual register stack number. The abbreviation "VR" means virtual register and "PR" means physical register.

In FIG. 1, a first window number n-1 is allocated global registers r0 through r9 and local registers R10 through R31. When a new procedure is called, an additional bank of registers is allocated to it. Referring to window number n, registers r0 through r9 remain the same since they are global. Six registers overlap the preceding window, with R10 to R15 of the caller's registers becoming R31 to R26 after the call. Ten registers are not included in the windows, so there are sixteen (32 - 10 - 6) unique registers per window even though each procedure sees 32 registers at a time. The overlapping registers are used for passing parameters. Similarly, in window number n+1, R10 to R15 of the caller's registers (window n) become R31 to R26 after the call, again providing six overlapping registers. As mentioned in the Background Section, the register windows scheme with its fixed size partitions creates registers that are saved even when not used.

The present invention minimizes the number of registers that are saved and restored at procedure interfaces by allowing individual procedures to allocate and deallocate an arbitrary number of registers (limited by the size of the logical register stack) from a pool of physical registers as needed. Registers in this pool are accessed through indirection or relocation pointers further described below. The register stacks can be viewed as the tops of software stacks that are available in registers, and therefore easily and quickly accessed. Thus, "dynamic allocation" of registers is controlled by called procedures themselves rather than predetermined by the compiler.

In one example of an embodiment of the invention, there may be 128 fixed-point and 128 floating-point registers. A typical hardware register file may include 64 static registers and 64 rotating registers. Register files may be implemented as stand alone integrated circuits or "on-board" a processor device. Details of implementing the physical register files themselves are known and not germane here. The present invention is equally applicable to either or both fixed-point and floating-point registers. It is described in the context of fixed-point registers for illustration. The following description uses these terms:

Physical Registers (PR): The physical register set visible to the system architecture. The actual number of physical registers is merely a design choice. It is assumed that the physical registers are implemented in register files.

Virtual Registers (VR): The register number as specified in an instruction. The VR number may be the same as the PR number, or the VR number may be modified as described below to determine the address of the corresponding PR.

Static Registers: Also called Global Registers, these are registers that do not participate in any stacking, or rotation. In other words these registers are accessed directly using the register address as provided in a syllable without any indirection. In the embodiment described below, VR addresses 0 to 31 are used unmodified to access PRs O to 31, which are the static registers.

Rotating Registers: These are registers allocated by a procedure to participate in software pipelining and are accessed as an offset from the RRB (rotating register base). Any procedure may access an arbitrary number of rotating registers at any instant, limited approximately by the number of physical registers. The rotating registers are addressed as a ring.

Stack Registers: The pool of registers that participate in stacking and rotation. Through the use of stack pointers, which specify the base or indirection for accessing the stack registers, the stack register pool is managed as a ring. (Rotating Registers thus are managed as a ring within a ring.) In other words, if VR(i) corresponds to the physically implemented stack register with the largest address, then VR (i+1) corresponds to the stack register with the smallest address. In the example described below, there are 96 stack registers (R32–R127). The rotating registers are drawn from the pool of stack registers. VRs 32 to 127 are modified by base pointers to determine the corresponding PRs (physical registers).

Local Registers: The stack registers that are accessible to the current procedure.

In addition to the Rotating Register Base (RRB) mentioned above, the preferred embodiment maintains the following additional indirection or base register values that point into the stack register file. (Preferably, the processor has two copies of each of the following base registers, one for the fixed-point stack and another for the floating-point stack.)

BOV (Bottom of Valid): The stack pointer marking the depth of the software stack that is accessible through the register stack. Allocating across BOV results in a stack overflow, and deallocating across BOV results in a stack underflow, further explained below.

BOL (Bottom of Local): The stack marker that bounds at one end the stack registers that are accessible to the current procedure. All the current procedure stack registers are accessed relative to BOL. In general, VRi accesses PRj, where P is the total number of stack registers and i and j are related by: j=i, if i<32; j=[(BOL+i−32) mod P]+32, if i>=32. (This assumes PR0–PR31 are static registers.) In the preferred embodiment, BOL defaults to the first stack register (PR32).

TOL (Top of Local): The stack marker that bounds at the other end the registers that are accessible to the current procedure. An attempt by a procedure to access a register that is not within its local area, i.e., a register that is out of the BOL-TOL bounds, will result in an exception.

OTOL (Old Top of Local): The value of TOL prior to the allocation of any parameter registers. The registers between TOL and OTOL are the allocated parameter registers.

BOR (Bottom of rotating): The stack marker that bounds at one end the stack registers that participate in rotation.

TOR (Top of rotating): The stack marker that bounds at the other end the stack registers that participate in rotation.

In general, the register stack benefit applies only to the stack registers, and the compiler will have to continue to adopt a caller/callee save/restore strategy for the static registers. All arguments and explanations apply equally to the fixed-point stack and the floating-point stack. Each stack has its own set of base registers. The fixed register file and the floating-point register file are each controlled separately. We will describe only the fixed-point stack in detail to illustrate the invention.

Local, parameter, and rotating registers are allocated or deallocated by executing a newly-defined operation, alloc. Allocation and deallocation of registers modifies TOL and OTOL if local registers are allocated/ deallocated. TOL and OTOL are incremented/decremented by the number of local registers being allocated/deallocated. Allocation/ deallocation of parameter registers modifies TOL. TOL is incremented/ decremented by the number of parameter registers being allocated/ deallocated, as illustrated in FIG. 3 described below. Allocation and deallocation of registers may also affect BOV in the case of stack overflow/underflow.

Allocation/deallocation of rotating registers modifies BOR, TOR, TOL, and OTOL. If rotating registers are being allocated, BOR is set to TOL. TOL, OTOL, and TOR are set to the sum of TOL plus the number of rotating registers being allocated. The converse modification results from deallocating rotating registers. The mechanism described permits variation of the number of physical registers, for example across machine models, without affecting programs.

On a procedure call (i.e., an execution of branch-and-link), the current state of the base registers is stored in parameter register 0. Thus the compiler must allocate one additional parameter register than the number of parameters that are passed to/from the called procedure. Additionally BOL is set to OTOL, and OTOL is set to TOL. On a procedure return, the base registers are reset from the values stored in parameter register 0. Procedure return includes deallocation of the local and rotating registers of the called procedure, and may thus incur a stack underflow.

The stack is said to overflow on an allocation when the TOL attempts to cross over BOV. Remember that all the arithmetic is performed modulo the number of registers physically implemented in the stack. Or, a modulo-plus function may be used to skip over the fixed register address space. Similarly the stack is said to underflow on a deallocation when the BOL attempts to cross over BOV. The occurrence of overflow/underflow is detected by the hardware and a trap-handler is invoked for appropriately spilling/restoring stack registers to/from the software stacks.

Note that the mechanism as described permits the use of hardware (or software) that drains and fills the register stacks in the background in anticipation of stack overflows and underflows. Stack overflows and underflows in the conventional sense thus may be avoided by a process we call "register cleaning" described later.

Operation of the allocation process is best explained through the use of an example. Assume that procedure A has BOL pointing to physical register 38 and TOL pointing to physical register 47. Thus the procedure A has 10 local registers. Prior to calling procedure B, procedure B allocates 4 parameter registers. This sets OTOL to 47, and TOL to 51. When the branch and link is executed, the base register values are packed into parameter register 0, i.e., physical register 48. (See "Control register A" below.) Additionally, BOL is set to 47. By placing the bottom of the called procedure (B) local space at OTOL, the parameter registers are common and become the bottom part of B's local space. OTOL and TOL are set to 51. Assume that procedure B allocates 10 local registers. This changes TOL and OTOL to 60. If procedure B now returns, BOL, TOL, and OTOL are reset to their initial values of 38, 47, and 51 respectively.

According to one embodiment, the values returned by procedure B to procedure A may be found in physical registers 48–51. Alternatively, return values may be placed in the static registers. This permits deallocation of the parameter registers immediately upon return, making them available for the next procedure call.

Note also that one parameter register (here 48) is used to store the pointer values when a procedure is called. More specifically, return information is stored in a control register (further explained below), and the compiler is required to copy it to the local register space and restore it to the control register before returning. Preferably, the TOL and OTOL values themselves are not saved, but instead values are saved which allow these values to be computed, nominally an offset to the previous value. Using an offset value allows them to be stored in any arbitrary register. Thus, the registers can be rotated any arbitrary amount and the mechanism described still works correctly. Another alternative embodiment is to allocate an extra parameter register for this purpose, so that a net number of registers usable for parameter passing equals the actual number allocated by the calling procedure. The allocation and deallocation of rotating registers operates in a similar manner.

Each register stack has a unique software stack into which registers are saved at a stack overflow, and from which registers are loaded on a stack underflow. Thus each register stack truly represents the tip of the appropriate software stack.

It is convenient in implementing the foregoing methods to provide the following control registers:

Control register A: This packs the various base pointers for the fixed-point stack - BOV, BOL, TOL, BOR, TOR, and OTOL.

Control register B: This packs the different base pointers for the floating-point stack - BOV, BOL, TOL, BOR, TOR, and OTOL.

Control register C: This contains the memory address of the software stack backing the register stack for the fixed-point registers.

Control register D: This contains the memory address of the software stack backing the register stack for the floating-point registers. Recall the appropriate base pointers are stored in the parameter register 0 preparatory to executing a procedure call.

Figures 2, 3A, 3B, 3C, 3D:
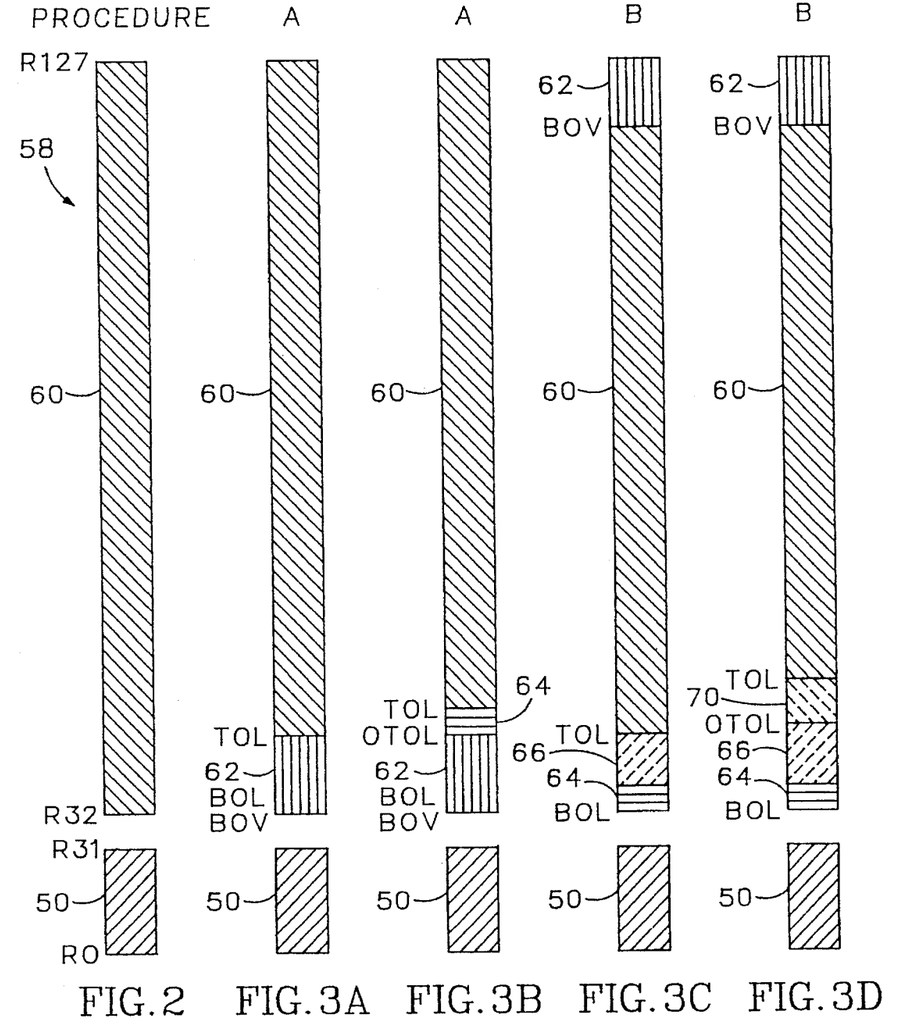

Turning now to FIG. 2, a logical address space model is illustrated for a set of registers numbered R0 through R127. Static registers 50 (R0 through R31) are reserved, for example, for global values, and are not involved in the local register allocation mechanism. Stack registers R32 through R127 are indicated by reference number 58 (not an address). The virtual addresses illustrated by the model illustrate the register stack as seen by software procedures. The virtual addresses (VR) are translated to actual or physical register addresses (PR) in order to access the physical register files as further explained below. Initially, an unallocated address space 60 comprises the entire register stack.

FIGS. 3A through 3I illustrate the virtual address space as seen by a series of called procedures. The called procedures are designated A,B,C and D at the top of each drawing. Note that directions "up" and "down" as well as the designations "top" and "bottom" in this model are arbitrary. For example, one could allocate local registers downward from the "top", here R127, and wrap around when the "bottom" of the stack (VR32) is encountered. We choose to illustrate the invention by allocating upward from R32. The principles of operation are the same as long as one is consistent.

Turning now to FIG. 3A, the logical address space of FIG. 2 is shown after a call to a first procedure "A". A logical address space (i.e. a contiguous series of virtual registers) 62 is allocated as local to procedure A. The BOL ("Bottom of Local") pointer indicates the bottom of A's local space, and TOL ("Top of Local") delimits the top of the procedure A local address space. BOV ("Bottom of Valid") is initialized to BOL and delimits space that currently is allocated. Reference number 60 indicates virtual registers (or address space) not yet allocated, i.e. space above TOL or below BOV. In FIG. 3B, procedure A allocates parameter space 64 for passing parameters to a subsequently called procedure. The parameter space 64 increases the local address space allocated to procedure A, as indicated by a corresponding upward adjustment of the TOL pointer to the top of parameter space 64. Pointer OTOL indicates the TOL value prior to allocation of parameter registers.

Procedure A next calls a procedure B. As noted, the pointers (Control register A) are stored in the first parameter register. Referring to FIG. 3C, procedure B allocates a local (virtual) address space that, as always, begins at the bottom of the stack (VR33) as delineated by the BOL pointer. A first portion of B's local space is mapped to the parameter passing registers 64 of procedure A so that parameter space 64 is common to procedures A and B. The called procedure's local space always starts at the bottom of the stack (BOL), and it always begins with the calling procedure's parameter space.

A procedure call thus may be considered as "pushing down" the virtual register stack such that the parameter passing space (e.g. 64) goes to the bottom. The calling procedure's local space (e.g. 62) is "wrapped around" to the top of the address space in FIG. 3C, delimited by adjusting the BOV (Bottom of Valid) pointer. Procedure B also allocates additional (purely local) registers 66, and bounded by the TOL pointer. As before, the remaining unallocated address space is indicated by 60.

Figures 3H, 3I:
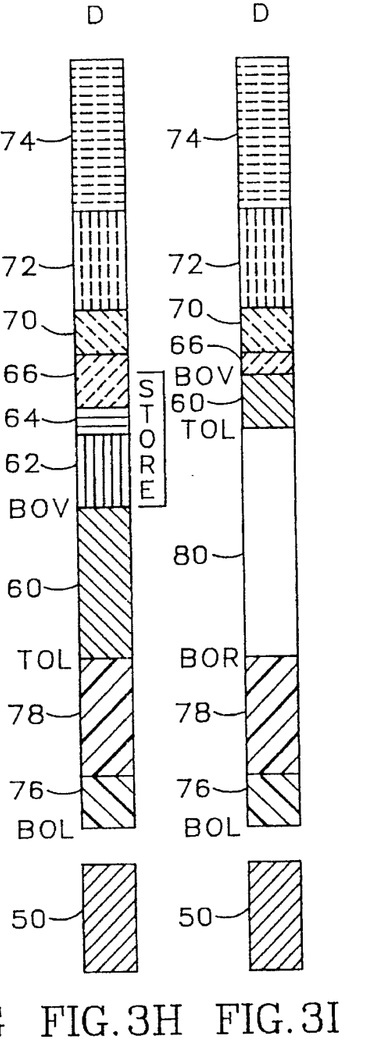
Figure 4A:
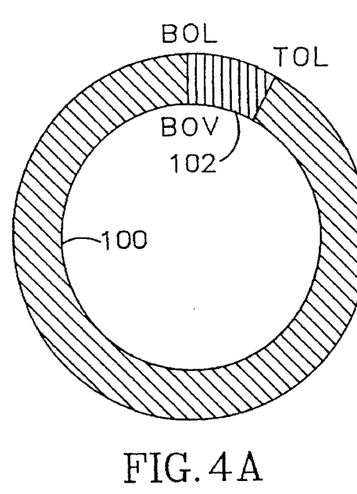
Figure 4B:
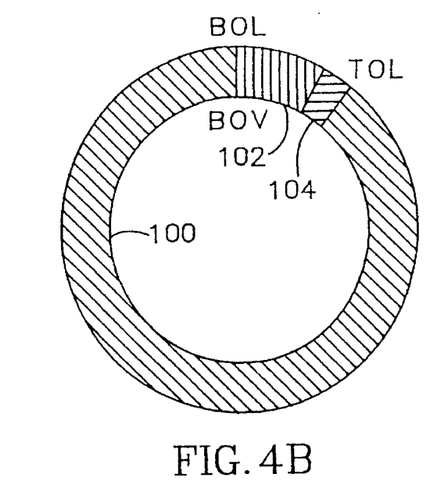

FIGS. 4A through 4I model a physical address space such as a register file. It is helpful at this stage to consider qualitatively the relationship of the virtual address space modeled in FIGS. 3A through 3I to the physical address space. Referring now to FIG. 4A, the BOL and BOV pointers indicate the origin of the register file address space, which may be for example physical address 0. The procedure A virtual address space 62 (FIG. 3A) corresponds to physical address space 102 (FIG. 4A) delimited by the TOL pointer. FIG. 4B also shows parameter space 104 which is allocated by procedure A and corresponds to virtual address space 64 in FIG. 3B. Reference number 100 indicates address space not currently allocated in the physical address space model. In general, reference numbers in FIGS. 3A–3I translate to corresponding reference numbers in FIGS. 4A–4I, respectively, by adding forty to the former.

Figure 4C:
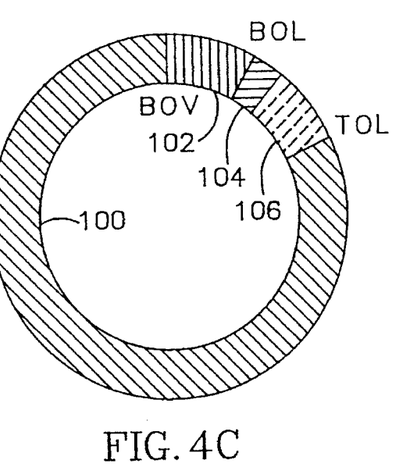

FIG. 4C shows the additional allocation of address space 106 which corresponds to the procedure B local address space 66 of FIG. 3D by adjusting the TOL pointer. Thus, it may be observed that while a called procedure's virtual address space always begin at the bottom of the register stack, there is no corresponding relocation of data in the physical register file. Rather, as illustrated in FIGS. 4A through 4I, additional registers are allocated by called procedures as needed without affecting the physical address spaces previously allocated. Next we refer again to FIG. 3D to consider additional procedure calls.

Procedure B allocates parameter passing address space 70, illustrated in FIG. 3D, by adjusting the TOL pointer. The remaining local address space 66 including the parameter address space 64 common to procedure A are not affected. The procedure A local address space 62 remains at the top of the address space illustrated in FIG. 3D, delineating by the BOV address pointer.

Figure 3E:
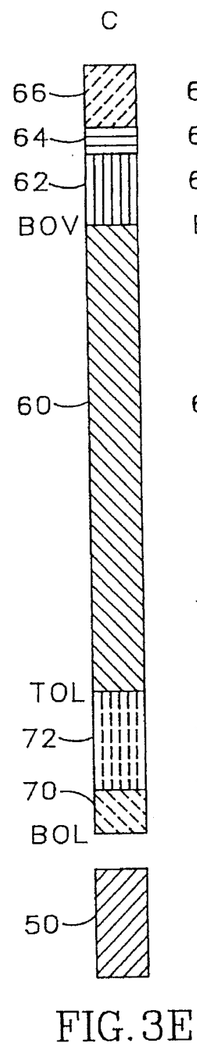

Referring to FIG. 3E, procedure B calls yet another procedure C. The logical address space for procedure C comprises the following. Beginning from the bottom of the logical address space (BOL), address space 70 is the parameter passing space common to procedure B. Procedure C allocates local address space 72 delineated by the TOL pointer. The calling procedure (B) local address space 64, 66 is "pushed down" and wraps around to the top of the model of FIG. 3E. The procedure A local space 62 is "pushed down" to accommodate the present call, and BOV moved accordingly. In other words, the register stack logically rotates. As always, the remaining unallocated address space is indicated by 60.

Figure 4D:
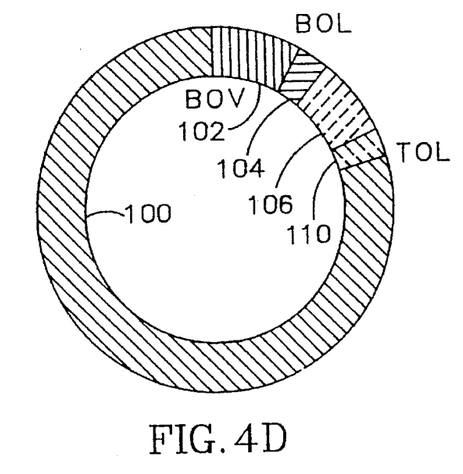
Figure 4E:
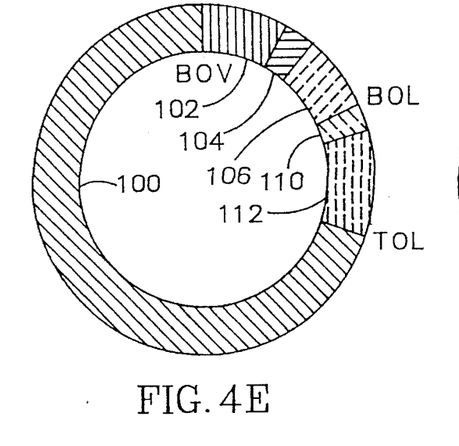

FIGS. 4D and 4E illustrate the physical address space corresponding to the logical address space modeled in FIGS. 3D and 3E respectively. Referring to FIG. 4D, parameter passing space 110 corresponds to the virtual parameter space 70 allocated by procedure B in FIG. 3D. Similarly, the local address space 112 in FIG. 4E corresponds to the virtual local address space 72 allocated by procedure C in FIG. 3E.

Figure 3F:
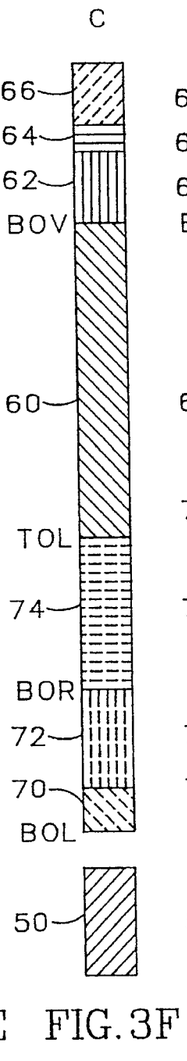

Referring now to FIG. 3F, procedure C allocates rotating register address space 74 in addition to the local space 72 previously allocated. The TOL (and TOR—see FIG. 3G) pointer indicates the top of the rotating register space and BOR indicates the bottom of the rotating register space. Virtual address spaces 62, 64, and 66 are not affected. FIG. 4F illustrates the corresponding allocation of physical address space 114, bounded by BOR and TOL. Note that the number of rotating registers can be varied according to the characteristics of software pipelined loops. Only in the case a procedure attempts to allocate rotating register space in excess of currently available address space does register overflow occur. This case is described below.

Figure 3G:
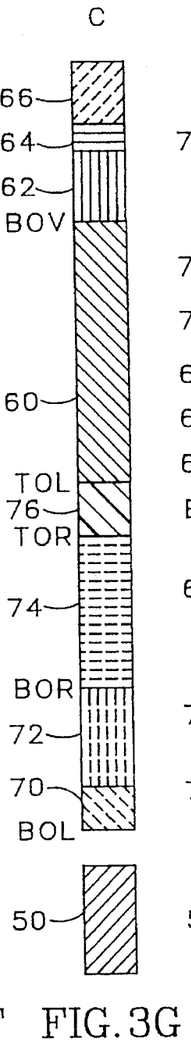
Figure 4F:
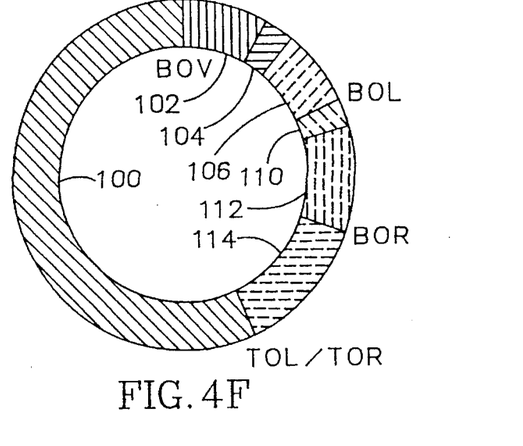
Figure 4G:
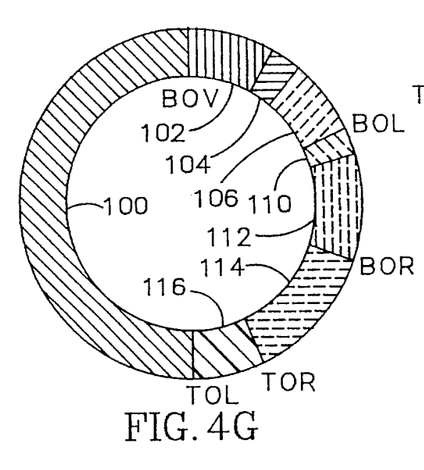

Next, referring to FIG. 3G, procedure C allocates parameter passing space 76 on top of the rotating register space 74, in anticipation of calling another procedure. TOL is adjusted to delimit the parameter space. Logical address space 60 remains unallocated. FIG. 4G illustrates the corresponding allocation of physical address space 116 for procedure C to pass parameters to another procedure.

Figure 4H:
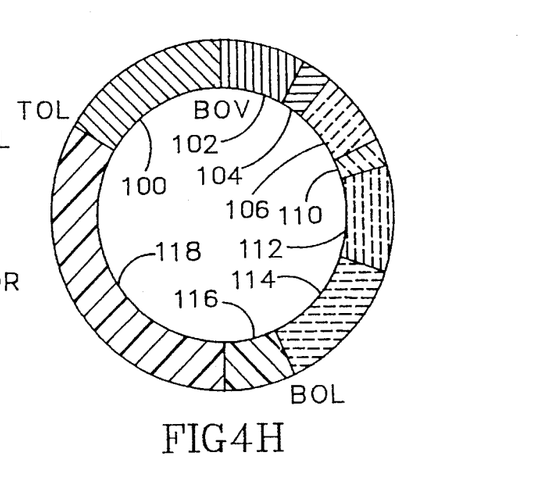

FIG. 3H illustrates the virtual address space model after another procedure D is called by procedure C. The parameter space 76 previously allocated by procedure C appears at the bottom of the procedure D local address space as usual. Additionally, procedure D allocates local address space 78 by adjusting the TOL pointer. Address space local to the calling procedure, i.e. procedure C (except for the common parameter passing space 76), is pushed down and wrapped around to the top of the model, as indicated by 70, 72 and 74 in FIG. 3H. Address spaces 66 and 64 which are local to procedure B are pushed down accordingly. Similarly, procedure A local space 62 is pushed down still further on the stack, and bounded as usual by the BOV (Bottom of Valid) pointer, leaving address space 60 still unallocated. FIG. 4H illustrates the corresponding allocation of physical address space 118 for procedure D to use as local registers.

Procedure D next attempts to allocate rotating register space in excess of the available address space indicated by 60 in FIG. 3H. This results in a register overflow condition. As a result, a portion of the memory space above the BOV pointer is saved to memory (not shown). The saved portion includes logical address spaces 62, 64 and part of 66. The BOV pointer moves up as a result of the overflow save operation, thereby freeing up additional space. The resulting unallocated address space 60 is more than adequate to accommodate procedure D's request for rotating registers. The result is illustrated in FIG. 3I, where 80 indicates the procedure D rotating register space.

Figure 4I:
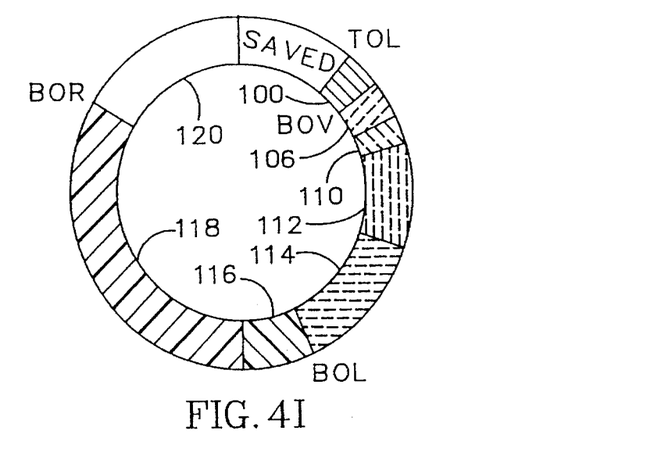

Referring to FIG. 3I, procedure D has allocated rotating register address space 80, delimited by the BOR and TOL pointers. In this case, somewhat more than the minimum space necessary was saved to memory. As a result, an unallocated portion 60 remains. This arises from arranging the overflow save mechanism so as to move a predetermined number of addresses, rather than merely the minimum immediately required. The number of addresses relocated in a save operation preferably is selected for efficient implementation in the subject hardware. The resulting hysteresis can reduce the number of memory references necessary in use. An alternative embodiment would save only enough address space to accommodate the pending allocation. The physical address model after register overflow and save, and after allocating the required rotating registers, is shown in FIG. 4I, where 120 indicates the procedure D rotating register space.

Details of register overflow save and restore mechanisms are known. However, another aspect of the present invention is a "cleaning" mechanism that works together with the virtual address stack register system so as to prevent register overflow entirely. A "clean" register is defined as a register having an accurate copy of its contents currently in memory. Conversely, a "dirty" register does not have a reliable copy of its contents in memory. Note that a dirty register may well be valid, i.e. currently allocated. A clean register space is delineated by BOC (Bottom of Clean) and TOC (Top of Clean) pointers. BOC is essentially the same as BOV. Initially, TOC equals BOC as there are no clean registers by definition until register contents are copied to memory. Register cleaning is done transparently in background, i.e. by "stealing" otherwise idle processor cycles.

When TOC is less than BOL, some registers have not been updated in memory. The register cleaning mechanism copies the next register, i.e. the values at TOC+1 to memory. Then it increments TOC, so that TOC always points to the top clean register. In general, the local registers may be ignored, as they are likely to be dirty frequently. So it is preferred to clean only up to BOL. Note that the cleaning process is transparent to the software and independent of the register allocation and deallocation methods and apparatus described.

Register File Port Access Circuit

Case One—Static Register Access

Figure 5:
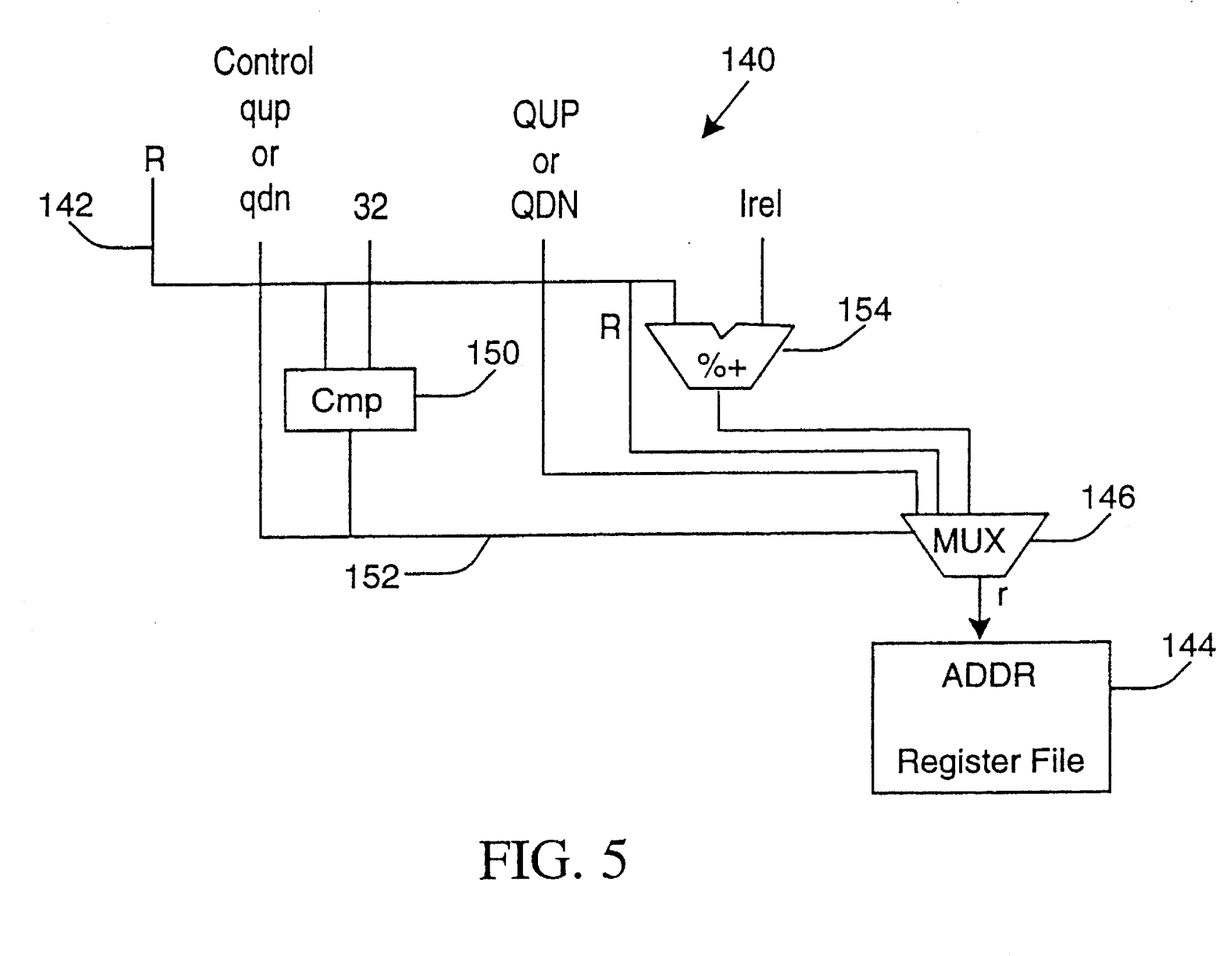
FIG. 5 is a hardware block diagram illustrating register file port access circuitry for implementing one embodiment of the present invention.

FIG. 5 is a block diagram of a register file port access circuit 140 according to the present invention. The physical registers, e.g. 128 registers, are provided in a series of hardware register files such as register file 144. An access circuit of the type shown in FIG. 5 is provided for each register file port. One function of the circuitry is mapping a logical address R, e.g an address provided by a software procedure, to a corresponding physical register address r for accessing the register file. In circuit 140, a logical register address R is input on line 142 and coupled to one of three inputs to a multiplexer 146.

A comparator 150 compares the value of R to a constant equal to the number of global or static registers in a particular application (32 in this example) to determine whether the logical address is among the static registers (i.e. R<32). If R is less than 32, the indicated address is within the range of static registers and the output from comparator 150 asserts multiplexer control lines 152 so that mux 146 selects the value R itself for input to the register file as the physical address. In other words, R is not modified for the static registers. As noted above, the static registers do not participate in the stack register operations.

Case Two—Register Stack Access

If R is equal to or greater than 32 (and qup or qdn is not asserted), R is a valid register stack virtual address, and it must be mapped to a physical register address. We assume for the moment that no rotating registers are allocated to the current procedure. In this case, the output of a modulo-plus adder 154 is selected through MUX 146 as the physical address presented to the register file 144. The modulo-plus adder 154 combines the logical address R with a local relocation term ("lrel"), an offset, using modulo arithmetic in order to determine the physical register address. The relocation addition is performed modulo the number of registers physically implemented in the stack. The local relocation term lrel equals the Bottom of Local pointer value (BOL) minus the number of fixed registers. Note that lrel is arbitrary; it is not restricted to any predetermined relocation offset amount or block size. Thus, only the exact number of registers allocated by a given procedure are used. Conversely, exactly the same number of registers are deallocated on a return.

To illustrate, assume the total number of hardware registers is 128 and registers 0–31 are fixed registers, so the register stack has 96 registers. Next assume a virtual stack address R=44 and BOL=40. Then R modulo-plus (BOL-32) equals 44+8 modulo 96=52. There is no "wrap around" from the modulo addition in this example. However, if BOL=90 then R modulo-plus (BOL-32) equals (44+58=102) modulo 96, which equals 6, except that the modulo-plus operation "skips over" R 0:31 so the resulting physical register file address r=38. In general, VR i accesses PR j, where P is the total number of stack registers and i and j are related by: j=i, if i<32; j=[(BOL+i−32) mod P]+32, if i>=32.

Case Three—Register Restoring and Cleaning

The register file port access circuit 140 also provides access for register restoring and "cleaning". A control signal "qup" indicates a read from main memory to restore registers which have been overwritten and now must be made valid again in the register file. It is used in conjunction with stack underflow to provide more valid registers. When qup is asserted, it controls mux 146 to select QUP as the address to access the register file. QUP is the address of the next register to be restored; i.e BOV-1.

QUP is the address of the next register to clean outside of the local space. This is the next available register, i.e. one not valid, so the QUP address is simply TOL plus 1. The contents of main memory are copied into the register file at that address, making that register clean by definition. TOC is then incremented so that it always points to the top of clean space.

A control signal "qdn" indicates cleaning a register by copying (writing) its contents to main memory. When qdn is asserted, it controls mux 146 to select QDN as the address to access the register file. QDN is the address of the next register to clean; i.e. TOC plus 1. The register cleaning mechanism copies the contents of the register to main memory. Then it increments TOC, so that TOC always points to the top clean register.

Note that QUP and QDN are mutually exclusive. A port has either one or the other, never both. QUP is implemented on a store port in the register file and always reads from memory. QDN is on a read port in the register file and always writes to memory. The notation "QUP or QDN" in FIGS. 5 and 6 is intended to convey this mutual exclusivity without proliferating drawing figures.

Register File Port Access with Rotating Register Implementation

Figure 6:
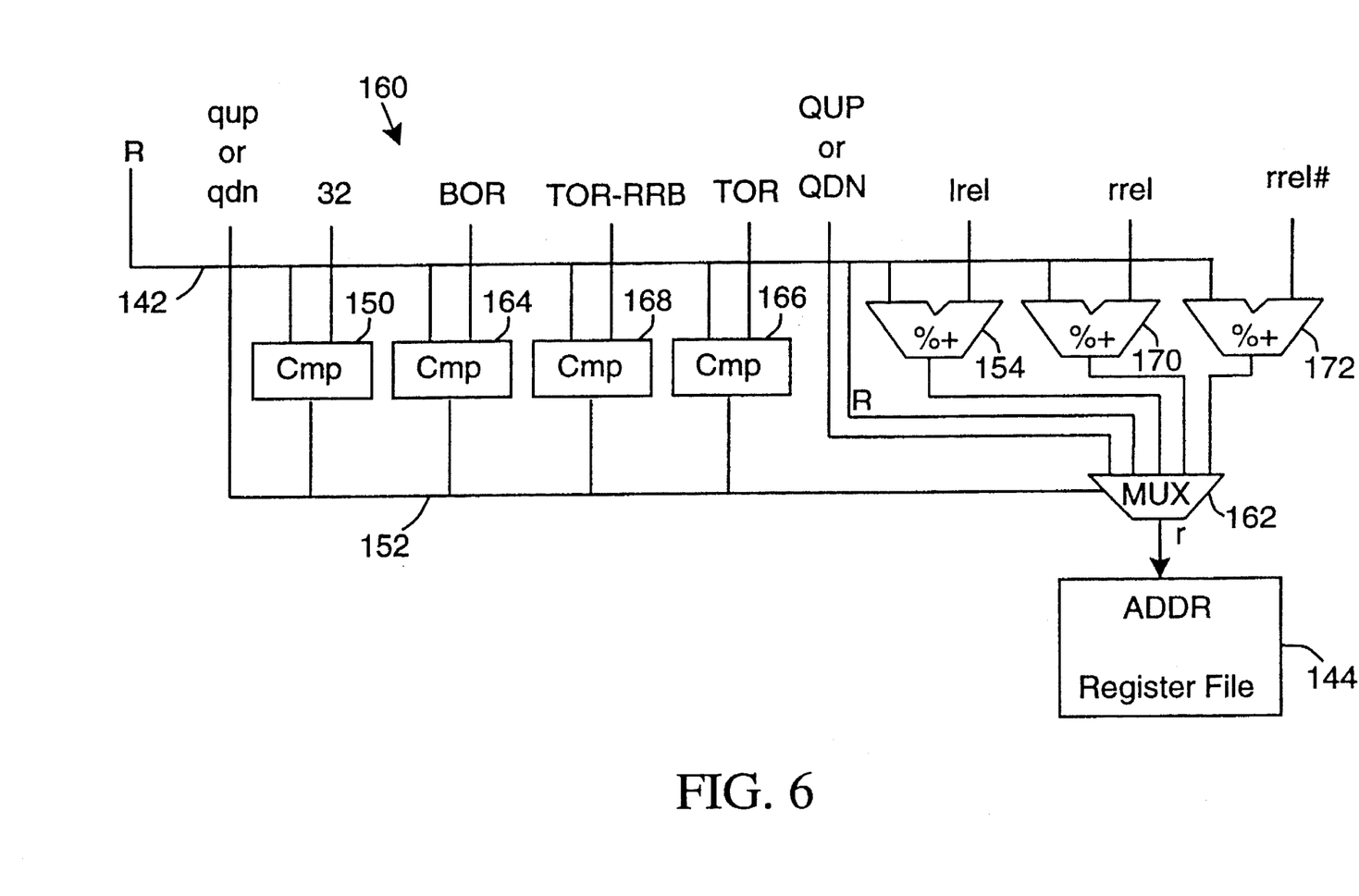
FIG. 6 is a hardware block diagram illustrating register file port access circuitry for implementing an alternative embodiment of the present invention that includes rotating registers in the register stack.

Turning now to FIG. 6, a register file port access circuit 160 is shown in block form. Circuit 160 of FIG. 6 has certain elements in common with circuit 140 of FIG. 5, and like reference numbers indicate the common circuit elements. Description of the common features is omitted. FIG. 6 includes additional circuit elements for implementing rotating registers within the register stack. As before, the logical address R is provided on input node 142. A comparator 164 compares the logical address R to the BOR (Bottom of Rotating) pointer. Another comparator 166 compares R to the TOR pointer. If R is above BOR and below TOR, this logical address indicates a register allocated to the current procedure as a rotating register.

The physical address r equals R plus some rotating relocation term rrel. The rotating relocation term rrel equals the local relocation term lrel plus the rotating register base value (RRB) to account for rotation within the rotating register set, assuming no wraparound in the rotating registers. Thus:

$r = R + lrel + RRB$

However, if there is wraparound in the rotating registers, then:

$r = R + lrel + RRB - (TOR - BOR)$ where TOR minus BOR yields the size of the rotating register set. In the access circuit 160, R is added to rrel in adder 170 (using modulo-plus operation as described above) and the result provided to mux 162. The relocation term rrel may be precomputed as both lrel and RRB are known in advance of R. For the wraparound case, an alternate relocation term rrel# is added to R in modulo-plus adder 172 and the result provided to mux 162, where rrel# equals lrel+ RRB−(TOR−BOR). Which value to select in mux 162 as r is determined as follows. Wraparound in the rotating registers occurs when the logical address would otherwise exceed the bounds of the rotating registers. Thus, the question is:

$$R-BOR+RRB>TOR-BOR?$$

From algebra, this test is equivalent to: R>TOR−RRB? This is determined by comparator 168 in FIG. 6, as it compares R to TOR−RRB. Thus, if the result is true, comparator 168 controls mux 162 so as to select the output of modulo-plus adder 172 as the physical address r. If the result is false, the rotating registers did not wrap around, so comparator 168 controls mux 162 so as to select the output of modulo-plus adder 170 as the physical address r.

Various circuits may be devised to accomplish the functions of circuits 140 or 160 as may be required. For example, the cleaning address features may be implemented in some applications but not others. Some applications may not provide for rotating registers within the subject stack, in which case circuitry like that of FIG. 5 will suffice. Others may calculate the rotation offset RRB elsewhere and provide the result to adder 170 as needed. The particulars of each implementation will be apparent to those skilled in the art in view of the present specification, subject to performance tradeoffs. Fast, parallel hardware is suggested, for example, in applications where the register file port addressing is a critical path.

Figure 7:
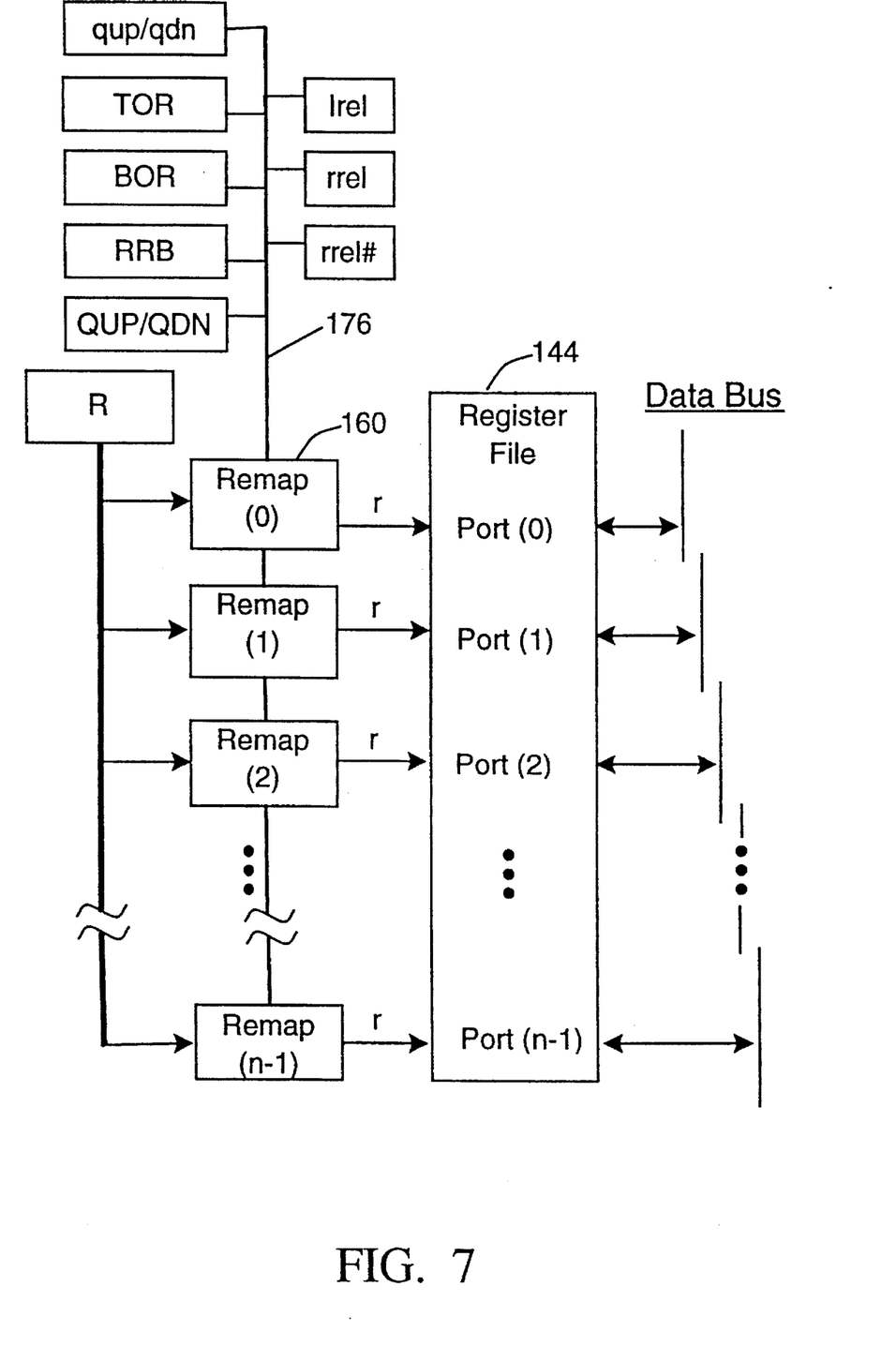
FIG. 7 is a hardware block diagram illustrating one example of a register file system for implementing the present invention.

FIG. 7 is a hardware block diagram illustrating generally one example of a register file system for implementing the present invention. A series of registers labeled qup/qdn, TOR, BOR, RRB, QUP/QDN, lrel, rrel and rrel# are provided for maintaining the corresponding pointer values. These registers are coupled over a bus 176 to provide pointer values as needed to remapping circuitry such as the register file port access circuit 160, described in detail above. One such remapping circuit is provided for each register file port used in a register file 144. Many variations on this general arrangement will be apparent to skilled hardware designers in view of the purposes and operation described above. For example, multiple pointer values may be compacted within fewer registers. Selected intermediate values or addresses may be precomputed to optimize performance. Other variations such as allocation of various tasks to hardware versus software (including microcode) are the subject of design tradeoffs and adaptation to a specific implementation, all of which may be considered equivalents to the embodiment described.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A method of dynamically allocating registers to procedures in a digital computer without compiler intervention, the method comprising the steps of:

defining a logical register stack comprising a plurality of stack registers;

initializing a local relocation term (lrel) so as to define an offset for mapping the logical register stack into the physical register set;

allocating to a first procedure an arbitrary number of stack registers specified by the first procedure as local registers by initializing a first stack pointer value (TOL) so as to delimit the local registers in the logical register stack;

initializing a first rotating register pointer value (BOR) and a second rotating register pointer value (TOR) to the first stack pointer value (TOL);

allocating registers to the first procedure as rotating registers by incrementing the second rotating register pointer value (TOR) and the first stack pointer value (TOL) by an arbitrary number of registers specified by the first procedure as rotating registers;

prior to returning from the first procedure, deallocating the rotating registers by decrementing the second rotating register pointer value (TOR) and the first stack pointer value (TOL) by number of first procedure rotating registers in connection with a register access operation during execution of the first procedure, mapping each logical register address R of a local register into the physical register set by determining a physical address r, responsive to the local relocation term (lrel) by;

if said logical register address R is within a range of static registers, setting said physical address equal to said logical register address R;

else, if said local register is not a rotating register, address is performing modulo-plus addition of said logical register R and lrel, wherein said modulo-plus is an addition of R and lrel modulo said arbitrary number of stack registers and offset by said range of static registers;

else, if said local register is a rotating register;

determining if said logical address R falls within a range of rotating registers defined by TOR and BOR;

if said logical address R does fall within said range of rotating registers, setting said physical address r to said logical address R modulo-plus a rotating relocation term rrel, where rrel equals lrel added to a rotating register base value RRB, wherein said rotating base value RRB;

else if said logical address R does not fall within said range of rotating registers, setting said physical address r to said logical address R modulo-plus an alternate rotating relocation term #rrel, where #rrel equals lrel added to RRB minus said range of rotating registers.

2. A method according to claim 1 further comprising:

storing the first stack pointer value (TOL) so as to form a second stack pointer value (OTOL);

allocating to the first procedure an arbitrary number of additional stack registers specified by the first procedure as parameter passing registers by incrementing the first stack pointer value (TOL) so as to include the parameter passing registers; and storing at least one parameter in the allocated parameter passing registers for reference by a called procedure, wherein said storing step includes mapping the parameter passing registers into the physical register set responsive the local relocation term.

3. A method according to claim 2 further comprising:

calling a second procedure;

allocating to the second procedure an initial local register space comprising the first procedure parameter passing registers thereby making said at least one parameter stored in said registers available to the second procedure without a memory reference;

allocating to the second procedure an arbitrary number of additional stack registers specified by the second procedure as local registers by incrementing the stack pointer value so ad to include the second procedure local registers without first saving the first procedure's local registers' contents to memory; and upon returning from the second procedure, deallocating the local registers by decrementing the stack pointer value by the number of local registers, thereby calling and returning from the second procedure without saving and restoring local register contents.

4. A method according to claim 3 further comprising:

upon calling the second procedure, storing the first and second stack pointer values (TOL,OTOL) to form stored values for reference upon a return from the second procedure; and wherein said deallocating step includes resetting the first and second stack pointer values to the said stored values.

5. A method according to claim 4 further comprising allocating to the first procedure an extra parameter register; and wherein said storing step includes storing stack pointer offset values in said extra parameter register for reference upon return from the second procedure.

6. A method according to claim 5 wherein said deallocating step includes computing stack pointer values from the stack pointer offset values stored in said extra parameter register and resetting the stack pointer values to the computed values.

7. A method according to claim 3 further comprising:

in the second procedure, returning a computed value to the first procedure by storing the computed value in a selected one of the first procedure parameter passing registers.

8. A method according to claim 3 further comprising:

providing a static register set; and, in the second procedure, returning a computed value to the first procedure by storing the computed value in a selected one of the static register set whereby the parameter registers are immediately available for a next procedure call.

9. A register file port access apparatus (140) for providing a physical address to access a register file port, the apparatus comprising:

input means (142) for receiving a virtual address (R) from a current procedure;

comparator means (150) for comparing the virtual address (R) to a predetermined constant (32) to determine whether the virtual address indicates a static register of a stack register;

means (154) for adding the virtual address to a local relocation term (lrel) to form a first physical address;

multiplexer means (146) for selecting one of the virtual address (R) and the first physical address and coupling the selected address (r) to the register file port;

control means (12) coupled to the multiplexer means so as to select the first physical address if the virtual address (R) indicates a stack register and to select the virtual address if the virtual address indicates a static register, thereby redirecting stack register references to physical register address allocated to the current procedure;

comparator means (164,166) for comparing the virtual address (R) to first and second rotating register pointer values (BOR, TOR) to determine whether the virtual address indicates a register allocated to the current procedure as a rotating register;

means (170) for adding the virtual address (R) to a first rotating relocation term (rrel) to form a first physical address;

means (172) for adding the virtual address (R) to a second rotating relocation term (rrel#) to form a second physical address;

multiplexer means (162) for selecting one of the first and second physical addresses and coupling the selected address (r) to the register file port address terminal (144);

control means (168,152) for controlling the multiplexer means (162) so as to select the first physical address if the virtual address (R) does not imply wraparound within the rotating register set and to select the second physical address if the virtual address does imply wraparound within the rotating registers; wherein the first rotating relocation term (rrel) equals the local relocation term (1erl) plus the rotating register base value (RRB), and the second rotating register base value (RRB) less the size of the rotating register set, thereby adjusting for the said wraparound within the rotating register set.

* * * * *